United States Patent Office 3,406,215
Patented Oct. 15, 1968

3,406,215
CHLORINATION OF BUTADIENE
Howard Emil Holmquist, Wilmington, Del., assignor to
E. I. du Pont de Nemours and Company, Wilmington,
Del., a corporation of Delaware
No Drawing. Filed Oct. 23, 1965, Ser. No. 504,167
4 Claims. (Cl. 260—655)

ABSTRACT OF THE DISCLOSURE

Process for the chlorination of butadiene by reacting butadiene with an organic solvent solution of cupric chloride in the presence of a second chloride salt, said cupric chloride and said second chloride salt being soluble in said solvent and recovering 1-chloro-1,3-butadiene and 2-chloro-1,3-butadiene.

---

Chlorobutadienes are valuble compounds from which useful polymeric materials may be synthesized. However, these compounds are manufactured by expensive procedures. In one method, they are produced from acetylene by a process which comprises dimerizing the actylene to vinylacetylene and hydrochlorinating the vinylacetylene to the chlorobutadienes. In another method, 1,3-butadiene is first chlorinated by addition and then dehydrochlorinated to the chlorobutadienes.

The reaction of 1,3-butadiene with cupric chloride supported on pumice in the temperature range of 200–330° C. has been described by R. P. Arganbright and W. F. Yates in Journal of Organic Chemistry, vol. 27, pages 1205–1208 (1962). In this reaction the products consisted of 98 mole percent of various dichlorobutenes and only 2 moles of 1-chlorobutadiene.

In its broadest description this invention is a process for the chlorination of butadiene which comprises contacting and reacting butadiene, under substantially anhydrous conditions, at a temperature between about 100° C. and about 250° C. with an organic solvent solution of cupric chloride, in the presence of a second chloride salt selected from alkali metal chlorides, calcium chloride, ammonium chloride and tetraalkylammonium chloride, the organic solvent being one in which the second chloride salt is at least slightly soluble, and thereafter recovering from the reaction product 1 - chloro - 1,3- butadiene and 2-chloro-1,3-butadiene.

While any tetraalkylammonium chloride may be used, there is no particular advantage to be gained in using compounds in which each alkyl group contains more than twelve carbon atoms. Examples of suitable tetraalkylammonium chlorides include tetramethylammonium chloride, tetraethylammonium chloride, tetrabutylammonium chloride, dodecyltrimethylammonium chloride, and the various other compounds in which the alkyl groups are branched or unbranched and in which the alkyl groups are all the same or are different. Of the alkali metal chlorides, lithium chloride is preferred because of its good solubility in polar organic solvents.

The requirements for the organic solvent to be used in carrying out the process of this invention are:

(a) It should be liquid under the conditions of the reaction.

(b) It should be resistant to reaction with the reagents.

(c) It should dissolve significant amounts of the salts being used in the reaction. In particular it should be able to dissolve, under the conditions of the reaction, at least 0.1 gram mole each of cupric chloride and of the second chloride salt per liter of solvent. If no significant amount of the second chloride salt dissolves in the solvent, the product will contain no significant amount of chloroprene. There should be used at least 0.2 gram mole of the second chloride salt per gram mole of cupric chloride. In general, because of solubility limitations, there is little practical advantage in using more than 35 moles of the second chloride salt per mole of cupric chloride, even though the ratio of 2-chlorobutadiene to 1-chlorobutadiene in the products increases with increasing ratios of the second chloride salt to cupric chloride.

In order for the salts to be sufficiently soluble, the solvent should be polar in character. Examples of suitable solvents include lower aliphatic carboxamides and their N-alkyl and N,N-dialkyl derivatives, lactams, containing 5 to 7 atoms in the ring and their N-alkyl derivatives, lower dialkyl sulfoxides and sulfones, cyclic alkylene sulfones containing 5 to 6 atoms in the ring, and N-alkylated phosphoramides.

The lower alphatic carboxamides may be represented by the formula:

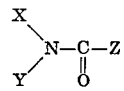

in which X, Y and Z may be hydrogen, or lower alkyl radicals containing up to four carbon atoms. Specific examples include formamide, acetamide, propionamide, butyramide, isobutyramide, valeramide, N-ethylformamide, N-butylacetamide, N-butylbutyramide, N-propylbutyramide, N,N-dimethylbutyramide, N,N-diethylpropionamide, N,N - dipropylacetamide, N,N - dipropylpropionamide, N,N - dibutylformamide, N, N - dibutylbutyramide, N - ethyl-N-methylactamide, and N,N - dimethylisovaleramide.

The lactams may also be represented by the formula given above when X and Z together form an alkylene radical containing three to five carbon atoms.

The lactams which may be used include 2-pyrrolidone, 2-piperidone, and caprolactam and their N-alkyl derivatives in which the alkyl radicals are lower alkyl containing one to four carbon atoms. Examples of the N-alkyl lactams are 1-methyl-2-pyrrolidone, 1-isopropyl-2-pyrrolidone, 1 - ethyl - 2 - piperidone, 1 - butyl - 2 - pyrrolidone, and N-methylcaprolactam.

Examples of the lower dialkyl sulfones and sulfoxides which may be used are those in which each alkyl group contains one to four carbon atoms such as dimethyl sulfone, dimethyl sulfoxide, diethyl sulfone, diethyl sulfoxide, dibutyl sulfone, dipropyl sulfoxide and methyl butyl sulfoxide. Examples of cyclic alkylene sulfones include tetramethylene sulfone and pentamethylene sulfone.

Another class of solvents which may be used includes the hexaalkyl phosphoric triamides in which the alkyl groups contain one to four carbon atoms. Examples include hexamethyl phosphoric triamide, hexaethyl phosphoric triamide, hexabutyl phosphoric triamide, and hexapropyl phosphoric triamide. Hexalkyl phosphoric triamides having mixed alkyl groups can also be used.

Of the solvents discussed above, the preferred ones are the N,N-dialkyl carboxamides and the N-alkyl lactams. The most preferred solvent is N,N-dimethylformamide because of its good solvent power and ready availability.

The amount of solvent is not critical except that a sufficient amount should be used to provide a liquid medium for the reaction under the conditions being used.

The reaction should be carried out under essentially anhydrous conditions to keep side reactions at a minimum. By essentially anhydrous is meant that precautions are taken to exclude water from the reactants and the reaction system.

The reaction may be carried out at temperatures ranging from about 100° C. to about 250° C. Below about 100° C. the conversion of starting material is too low to be of practical use. In general, there is no reason to use temperatures above about 250° C. since most useful solvents boil below this temperature. The preferred temperature will depend somewhat on the solvent being used. In the case of dimethylformamide, the preferred temperature range is 145–153° C.

It is generally most convenient to carry out the reaction at atmospheric pressure, although higher or lower pressures may be used. A temperature above the boiling point of the particular solvent being employed will necessitate the use of superatmospheric pressure.

The two isomeric chlorobutadienes may be separated from each other by gas chromatography or by fractional distillation in an efficient column.

The process may be operated in either a batch or a continuous manner. It is particularly adaptable to a continuous process in which the product stream is removed from the reaction vessel, and the unused butadiene is removed from the products and recycled to the reaction vessel. The by-product, cuprous chloride, formed during the process may be reoxidized to cupric chloride, for example, by treatment with chlorine.

The chlorobutadienes prepared by the process are starting materials for the preparation of polymers. Particularly, the chloroprene, on polymerization, yields highly useful synthetic elastomers. In addition, the 1-chloro-1,3-butadiene may be used as a starting material for other compounds. For example, it may be converted to a Grignard reagent as described in U.S. Patent 3,083,242 and thus used for the preparation of a wide variety of organic compounds.

EXAMPLES

The examples are carried out using the following general procedure:

The reaction is carried out in either a 250 ml. three-necked round-bottomed flask (RBF) or a 1 l. resin kettle (RK), as shown in the table. The vessel is flushed out with introgen and the solvent is placed in the reaction vessel. The anhydrous salts are weighed by difference and added rapidly in a stream of nitrogen to avoid contact with atmospheric moisture. The contents of the vessel are heated to the desired temperature while nitrogen is bubbled through, with stirring to dissolve the salts. While the contents of the vessel are maintained at the desired temperature, gaseous butadiene is introduced with rapid stirring at a rate of about 40 ml./min. (at about 27° C. and atmospheric pressure) unless indicated otherwise, for the period of time shown in the table. Volatilized products are trapped in a receiver which is cooled with a mixture of solid carbon dioxide and acetone (about −78° C.) and which is fitted with a condenser which is also cooled by solid carbon dioxide and acetone. When the introduction of butadiene is stopped, nitrogen is passed through the reaction mixture for 10 minutes to sweep out any materials more volatile than the solvent. To the contents of the receiver is added 5 ml. of ethyl ether. The receiver is allowed to warm almost to room temperature while most of the butadiene is distilled into a Dewar trap cooled with a mixture of acetone and solid carbon dioxide. To recover any products entrained with the butadiene, 5 ml. of ethyl, ether is added to the contents of the Dewar trap, and the contents are allowed to partially evaporate. The residues from the two evaporations are analyzed by gas chromatography on a commercial gas chromatographic instrument using a 250-cm. glass column packed with calcined diatomite aggregates having adsorbed thereon 20% by weight of polyethylene glycol having a molecular weight of 15,000–20,000 and a softening point of 50–55° C. The amounts of 1-chloro-1,3-butadiene and chloroprene shown by the analysis are used to calculate the percent conversion based on the amount of cupric chloride introduced to the reaction vessel using the following formula:

$$\text{Percent conversion} = \frac{\text{moles of product}}{1/2 \text{ moles of CuCl}_2} \times 100$$

The data from the various examples are shown in the table. The following abbreviations are used.

TMAC—tetramethylammonium chloride
DTMAC—dodecyltrimethylammonium chloride
DMF—N,N,-dimethylformamide
DMAC—N,N-dimethylacetamide
2-Pyr—2-Pyrrolidone
DMSO—dimethyl sulfoxide
HMP—hexamethyl phosphoramide
TMS—tetramethylene sulfone (tetrahydrothiophene 1,1-dioxide)

TABLE

| Example | Vessel | CuCl₂(A), wt., g. | Nature | Second chloride salt (B), wt., g. | Mole Ratio, B/A | Temp., °C. | Butadiene Addition, hr. | Solvent Nature | Solvent ml. | Mole Ratio, α/β [5] | Product conversion [4] Percent-α | Product conversion [4] Percent-β |
|---|---|---|---|---|---|---|---|---|---|---|---|---|
| 1 | RBF | 9.7 | LiCl | 18.9 | 6.2 | 150 | 5 | DMF | 125 | 3.5 | 18.9 | 5.3 |
| 2 | RK | 6.9 | LiCl | 70.0 | 32.2 | 150 | 1.5 | DMF | 500 | 1.4 | 17.0 | 12.1 |
| 3 | RBF | 12.4 | LiCl | 4.0 | 1.0 | 150 | 6 | DMF | 125 | 12 | 4.7 | 0.4 |
| 4 | RK | 31.7 | KCl | [2] 5.5 | 0.3 | 150 | 5 | DMF | 500 | 100 | 3.2 | 0.032 |
| 5 | RK | 23.2 | NaCl | [3] 4.8 | 0.5 | 150 | 5 | DMF | 400 | 45.5 | 3.3 | 0.073 |
| 6 | RBF | 11.9 | CaCl₂ | 12.2 | 1.2 | 150 | 5 | DMF | 125 | 5.0 | 10.4 | 2.1 |
| 7 | RBF | 6.5 | TMAC | 11.8 | 2.2 | 150 | 5.5 | DMF | 125 | 125 | 1.55 | 0.75 |
| 8 | RBF | 13.7 | DTMAC | 36.2 | 1.3 | 153 | 5 | DMF | 125 | 3.3 | 5.1 | 1.6 |
| 9 | RBF | 11.5 | LiCl | 18.9 | 5.2 | 166 | 5 | DMAC | 125 | 2.9 | 3.5 | 1.2 |
| 10 | RBF | 13.9 | LiCl | 19.6 | 4.5 | 150 | 3.5 | 2-Pyr | 125 | 37 | 4.9 | 0.13 |
| 11 | RBF | 10.2 | LiCl | 15.7 | 4.9 | 150 | 5.5 | DMSO | 125 | 4.6 | 2.7 | 0.6 |
| 12 | RK | 20.1 | LiCl | 33.6 | 5.3 | 150 | 5 | HMP | 500 | 500 | 0.17 | 0.42 |
| 13 | RK | 51.4 | LiCl | 61.3 | 3.8 | 250 | 3.25 | TMS | 500 | 2.1 | 8.0 | 3.8 |
| 14 | RBF | 9.8 | LiCl | 15.5 | 5.0 | 150 | 5 | DMF / HMP | 100 / 25 | 2.2 | 2.2 | 1.0 |
| 15 | RBF | 15.2 | None | None |  | 150 | 5 | DMF | 125 | 1,000 | 11.7 | 0.01 |

[1] Added at the rate of 50–70 ml./min.
[2] Of 50.1 g. added, 44.6 g. were recovered by filtration at 100° C. after reaction.
[3] Of 10.0 g. added, 5.2 g. were recovered by filtration at 100° C. after the reaction.
[4] Based on CuCl₂.
[5] α is 1-chloro-1,3-butadiene, β is 2-chloro-1,3-butadiene.

What is claimed is:

1. Process for the chlorination of butadiene which comprises contacting and reacting butadiene, under substantially anhydrous conditions, and at a temperature between about 100° C. and 250° C., with an organic solvent solution of cupric chloride, in the presence of from at least 0.2 to 35 gram moles, per gram mole of cupric chloride, of a second chloride salt selected from alkali metal chlorides, calcium chloride, ammonium chloride, and tetraalkylammonium chlorides, said organic solvent (1) providing a liquid medium for the reaction, (2) being polar and (3) one in which at least 0.1 gram mole of said cupric chloride and at least 0.1 gram mole of said second chloride salt, per liter of said solvent, are soluble therein, and recovering from the reaction product 1-chloro-1,3-butadiene and 2-chloro-1,3-butadiene, said organic solvent being selected from
(I) an organic compound having the formula:

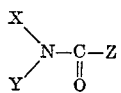

in which X, Y and Z are hydrogen or alkyl radicals having from 1 to 4 carbon atoms or in which X and Z taken together are an alkylene radical having from 3 to 5 carbon atoms.
(II) dialkyl sulfoxides, the alkyl groups thereof having from 1 to 4 carbon atoms.
(III) dialkyl sulfones, the alkyl groups having from 1 to 4 carbon atoms.
(IV) cyclic alkylene sulfones having 5 to 6 atoms in the ring.
(V) hexaalkyl phosphoric triamides, the alkyl groups thereof having from 1 to 4 carbon atoms.

2. The process of claim 1 in which the said solvent is dimethyl formamide.

3. The process of claim 2 in which the temperature of reaction is from 145° to 153° C.

4. The process of claim 1 in which the second chloride salt is lithium chloride.

References Cited
UNITED STATES PATENTS
3,061,653  10/1962  Stewart _____ 260—655
3,184,514  5/1965  Sennewald et al. _____ 260—654

FOREIGN PATENTS
918,062  2/1963  Great Britain.

BERNARD HELFIN, *Primary Examiner.*

J. BOSKA, *Assistant Examiner.*